Dec. 3, 1968   JAMES E. WEBB   3,414,012
ADMINISTRATOR OF THE NATIONAL AERONAUTICS
AND SPACE ADMINISTRATION
DUAL LATCHING SOLENOID VALVE
Filed June 28, 1967   2 Sheets-Sheet 1
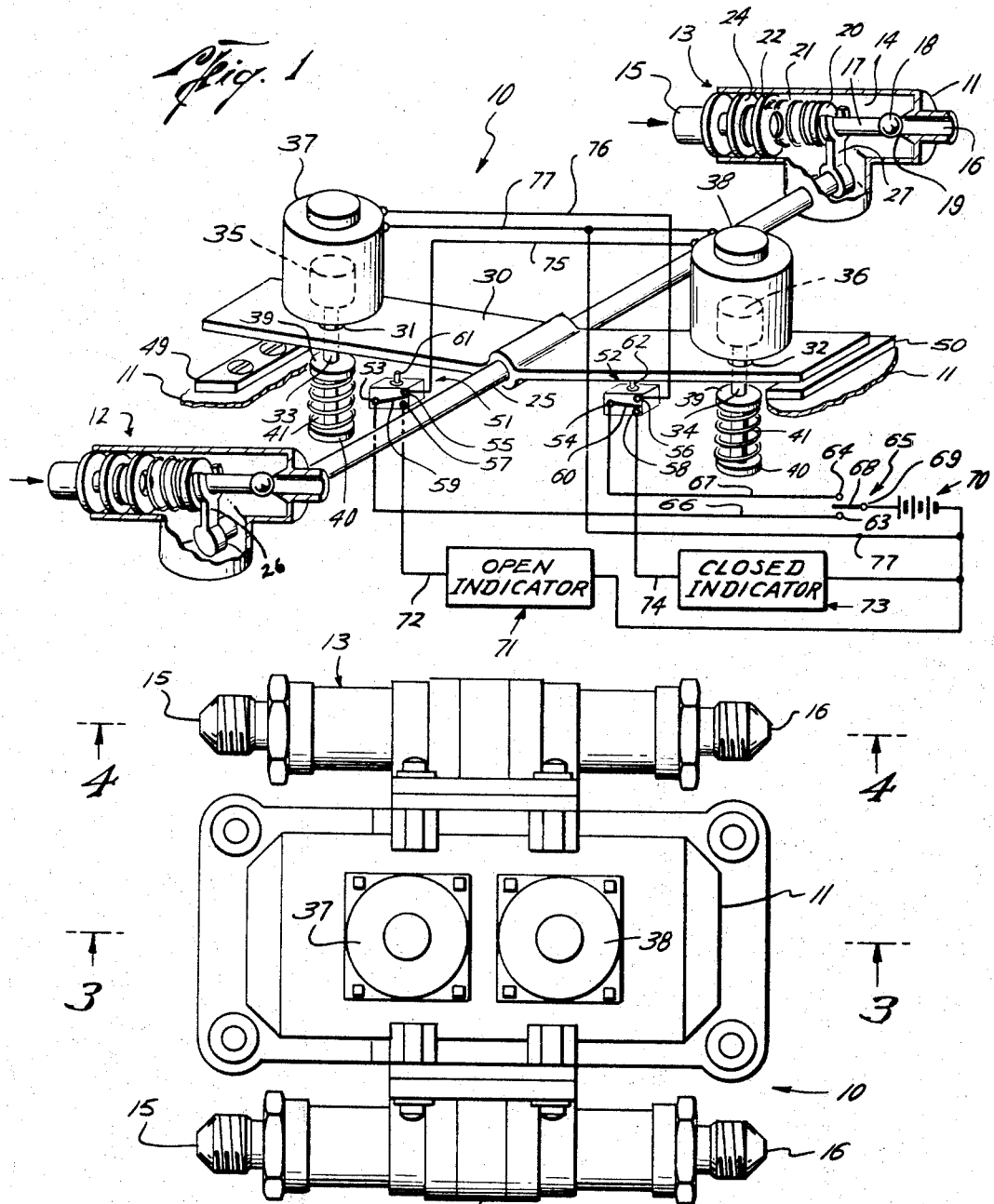
William C. McNutt
Hugh G. Odell
INVENTORS
BY
ATTORNEYS Dec. 3, 1968            JAMES E. WEBB            3,414,012
ADMINISTRATOR OF THE NATIONAL AERONAUTICS
AND SPACE ADMINISTRATION
DUAL LATCHING SOLENOID VALVE
Filed June 28, 1967                    2 Sheets-Sheet 2

William C. McNutt
Hugh G. Odell
INVENTORS

BY
ATTORNEYS

United States Patent Office 3,414,012
Patented Dec. 3, 1968

3,414,012
DUAL LATCHING SOLENOID VALVE
James E. Webb, Administrator of the National Aeronautics and Space Administration with respect to an invention of William C. McNutt and Hugh G. Odell
Filed June 28, 1967, Ser. No. 650,166
9 Claims. (Cl. 137—554)

ABSTRACT OF THE DISCLOSURE

A valve assembly for simultaneously controlling the flow of more than one fluid, said assembly having separate valve means which are movable between open and closed positions by a rocker arm which in turn is actuated by electrical solenoids. Releasable, latching means which are independent of the solenoid means are provided in the assembly which securely latch each of the valve means in one of its said positions whenever the rocker arm moves the valve means to that position.

---

The invention described herein was made in the performance of work under a NASA contract and is subject to the provision of Section 305 of the National Aeronautics and Space Act of 1958, Public Law 85–568 (72 Stat. 435); U.S.C. 2457.

Background of the invention

The present invention relates to a valve assembly which is capable of simultaneously controlling the flow of more than one fluid, and one which is extremely stable under vibration, acceleration, and shock loads.

In certain applications such as spaceflight, the use of fuel cells as a source of electrical power is now a reality. A fuel cell is an electrochemical device in which energy derived from a continuously supplied chemical reaction is converted directly into electrical energy. A typical example of such a cell is one where two reactants—fuel (hydrogen) and an oxidizer (oxygen) are combined in the presence of a special ion-exchange membrane wherein the energy derived from the resultant reaction (formation of water) is converted directly into electrical energy. In spaceflight applications both the fuel cells and their reactants are located at a point remote from the cabin section of the spacecraft. Accordingly, the valves used to turn on or off the flow of the reactants must be capable of being remotely controlled, and must be synchronized so that both reactants are either on or off at the same time.

Electrically operated solenoid valves per se, which are normally used in remote operations, were found to be inadequate for the above described application due to the fact that these valves cannot normally be latched in an open or a closed position without electrical power being continuously supplied to the solenoid. Since the electrical supply aboard a spacecraft is severely limited, the use of such valves is undesirable. Further, regular solenoid valves are sometimes affected by the vibrations, acceleration, and/or shock loads. These forces, which are present in spacecraft operations, tend to cause accidental unseating of these valves. Manually operated valves are impractical for space applications due to the difficulty in operating the valves from a remote station.

Summary

The present invention provides a solenoid-operated valve assembly which is capable of controlling the flow of more than one fluid, and which can be latched in either an open or a closed position without using continuous electrical power. The invention provides a highly stable valve assembly which is virtually unaffected by vibrations, accelerations, or shock loads. Structurally, the preferred embodiment of the present invention comprises a body having two parallel chambers therein, each chamber having an inlet and an outlet so that each form a separate flow path through the body. A spring biased valve is slidably mounted in each chamber so that the valves will normally block flow through the outlets of the chambers. An operating rod is pivotally mounted in the body and extends perpendicularly across both of the chambers. A fork-like means is provided on each end of the rod which cooperates with the valves in the chambers so that the valves will be moved back and forth whenever the rod is rotated.

Connected to the rod at its midpoint is a balanced rocker arm which extends perpendicular to the axis of the rod. Solenoid means are located near the outer ends of the rod. Solenoid means are located near the outer ends of the rocker arm which, when alternately actuated, will rotate the arm and hence the rod to operate the valves in each chamber. Permanent magnets are positioned in the body so that they will cooperate with the rocker arm to hold it in a latched position whenever the ends of the arm are moved into contact with the magnets. Due to the construction of the assembly, the latching of the arm in a set position will inherently latch the valves in a set position, thereby assuring stability of the valve assembly. Contact switches are also positioned in the body to be engaged by the ends of the rocker arm, whereby electrical power to the solenoids is cut off when the valves have moved from one position to the other.

The actual construction, operation, and the apparent advantages of the invention will be better understood by referring to the drawings in which like numerals identify like parts and in which:

Brief description of the drawings

FIG. 1 is a schematic view of the valve assembly in accordance with the present invention;

FIG. 2 is a plan view of the invention;

Description of the preferred embodiment

Figure 4:
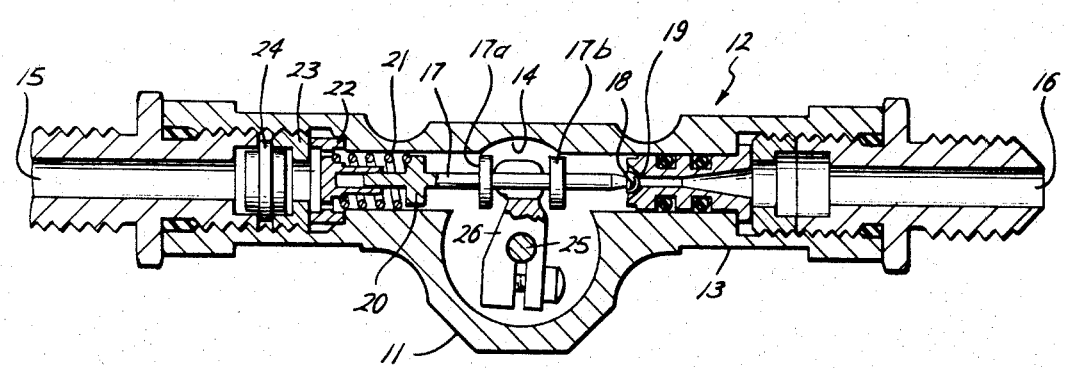
FIG. 4 is a cross-sectional view of the invention taken along line 4—4 of FIG. 2.

Referring more particularly to the figures, especially FIG. 1, valve assembly 10 comprises a body 11 having two separate valve units 12, 13 which are parallel and spaced from each other. For all practical purposes the two valve units are identical, so for the sake of brevity, like parts in each unit will be identified by the same numeral. Each valve unit comprises a chamber 14 having an inlet 15 and an outlet 16. A valve mandrel 17 is slidably mounted in the chamber 14, said mandrel terminating at one end in ball 18. Ball 18 cooperates with seat 19 on outlet 16 to open or close valve units 12, 13. Located near the other end of mandrel 17 is flange 20. Spring 21 is positioned between flange 20 and guide member 22 which is held in place by threaded retainer 23 (see FIG. 4). Spring 21 normally biases ball 18 onto seat 19. A filter 24 may be provided, if desired, in each of the valve units to entrap any foreign matter that may be present in the flowstreams.

Pivotally mounted in body 11 and extending perpendicularly to valve units 12, 13 and is an operating rod 25. Fork-like elements 26, 27 are fixedly secured to the respective ends of rod 25. Each fork cooperates with the flanges 17a, 17b on its respective mandrel 17 so that when shaft 25 is rotated counterclockwise as viewed in FIG. 1, each mandrel will be moved against springs 21 to unseat ball 18 and allow flow through the valve units.

Figure 3:
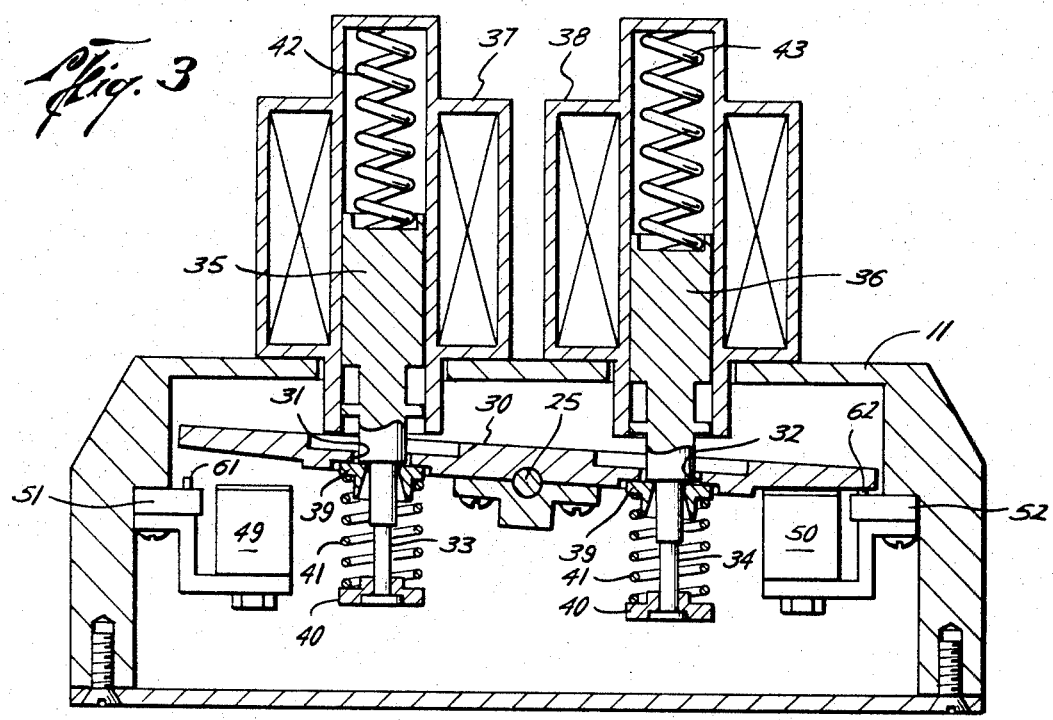
FIG. 3 is a cross-sectional view of the invention taken along line 3—3 of FIG. 2.

Fixedly secured to the midpoint of rod 25 is a dynamically balanced rocker arm 30 which can be comprised entirely of magnetic material, or can be of lightweight material (aluminum) with magnetic material at either end. It is easily seen that whenever arm 30 is rocked, rod 25 will rotate. Arm 30 has openings 31, 32 near its respective ends through which pass rods 33, 34. These rods are attached to, or are formed integral with, armatures 35, 36, respectively, of solenoids 37, 38. Mounted on each of rods 33, 34 (see FIG. 3) are retainers 39, 40 which are held in a spaced relationship by springs 41. As can clearly be seen in FIG. 3, retainers 39 will bear on the underside of rocker arm 30 to provide a driving connection between rods 33, 34 and arm 30, for a purpose explained below. Solenoids 37, 38 contain springs 42, 43, respectively, which normally bias armatures 35, 36 toward an extended position whenever said solenoids are inactuated.

Permanent magnets 49, 50 are positioned in body 11 adjacent and below the respective ends of arm 30 so that whenever an end of arm 30 is moved into contact with its respective magnet, the magnet will tend to "latch" the arm in that position. Also positioned below the respective ends of arm 30 and adapted to be engaged thereby are electrical switches 51, 52. These switches can be any type of standard electrical switch, e.g. push-type, contact, etc. In the embodiment shown, they are disclosed as push-type switches, and since they are identical, they will be described simultaneously with the first numerals mentioned referring to switch 51 and the second numerals referring to switch 52, respectively. The switches (see FIG. 1) have an inlet contact 53, 54 and two separate outlet contacts 55, 56 and 57, 58, respectively. A conductor 59, 60 is pivotally mounted to inlet contact 53, 54 and is normally biased upward to make contact with outlet contact 55, 56 by a spring or the like (not shown). A plunger 61, 62 is provided in the switch which is adapted to be engaged by an end of arm 30 to move conductor 59, 60 downward against its bias to make contact with outlet contact 57, 58 whenever said one end of arm 30 is moved downward.

Inlet contacts 53, 54 of switches 51, 52 are connected to outlet contacts 63, 64 of switch 65 by lines 66, 67, respectively. A movable conductor 68 is pivotally connected to inlet 69 which in turn is connected to a power source such as a battery 70. Outlet contact 57 of switch 51 is connected to first indicator means 71, e.g. light bulb or the like, by line 72. Outlet 58 of switch 52 is connected to a second indicator means 73 by line 74. Outlet contact 55 of switch 51 is connected to solenoid 38 by line 75, and outlet contact 56 is connected to solenoid 37 by line 76. A ground line 77 is connected to both solenoids 37, 38 to complete an electrical circuit.

The operation of valve assembly 10 is as follows. With assembly 10 in the position shown in FIG. 1, valve units 12, 13 are both in a closed position, that is, the balls 18 of units 12, 13 are biased onto seats 19 of each unit, preventing flow through the units. In this position, arm 30 is held in a latched condition by magnet 50. To open these units simultaneously, conductor 68 of switch 65 is switched to contact 63 which allows current to travel along line 66, through conductor 59, line 75 to solenoid 38. This causes armature 36 to move upward in solenoid 38 which in turn causes upper retainer 39 on rod 34 to engage the under side of arm 30. Continued upward movement of armature 36 disengages arm 30 from magnet 50 and rotates the arm and hence the operating shaft 25. The counterclockwise rotation of shaft 25 will also rotate forks 26, 27 which move the mandrels 17 in units 12, 13 against the bias of springs 21 to open said units. Solenoid 38 continues to operate until the other end of arm 30 is engaged by magnet 49. As the arm moves to this position it will contact the plunger 61 of switch 51 which moves conductor 59 from contact 55 to contact 57. This cuts off power to solenoid 38, and spring 43 will return armature 36 to a down position. No power is necessary to hold the valve assembly in an open position since magnet 49 will hold both arm 30 and rod 25 against any accidental rotation. Current will now be supplied through line 66, contacts 53, 57, line 72 to indicator means 71 which now lights up to show that assembly is in an open position. It is noted that as the right side of arm 30 moves up, the spring (not shown) in switch 52 will move conductor 60 up to contact 56 so that when it is desired to close the assembly, conductor 68 of power switch 65 is switched from contact 63 to contact 64. Current will now actuate solenoid 37 to move armature 35 upward, and upper retainer 39 will move arm 30 up to disengage arm 30 from magnet 49. Arm 30 will be returned to the position shown in FIG. 1 which will depress switch 52 to cut off power to the solenoid 37 and will light up indicator means 73 which now indicates the assembly to be in a closed position.

From the above disclosure it is seen that the invention provides a highly stable valve assembly which can simultaneously control the flow of more than one fluid. It should be recognized that by rotating one of the valve units 180° about an axis perpendicular to the shaft 25 whereby it is mounted with its valve mandrel 17 directed oppositely from the valve mandrel of the other valve unit, it would be possible to close one unit and open the other simultaneously. Also, by extending rod 25 and providing additional parallel valve units in body 11, it could be possible to control more than two flows simultaneously.

Although a particular embodiment of the subject invention has been illustrated and described, the disclosure is intended to cover all changes and modifications therein which do not constitute departure from the spirit and scope of the invention.

What is claimed and desired to be secured by Letters Patent is:

1. A valve assembly comprising:
    a body having at least two spaced and parallel chambers, each chamber having an inlet and an outlet and defining a separate flow path through the body;
    at least a pair of mandrels, one slidably mounted in each of said chambers, each of said mandrels having a valve means at one end thereof adapted to seat with its respective outlet when said valve assembly is in a closed position, and movable away from said outlet when said assembly is in an open position;
    means in each chamber to normally bias said valve means to a closed position;
    an operating rod pivotally mounted in said body and extending askew of said chambers;
    at least a pair of fork-like elements, one affixed to each respective end of said operating rod, said elements being operably connected to a respective mandrel whereby rotation of said rod will move said valve means from one position to the other;
    a rocker arm perpendicularly secured to said operating rod, said rocker arm being of magnetic material at its ends;
    a pair of electrically-actuated solenoids, one near either end of said rocker arm;
    means to couple said ends of said rocker arm to their respective solenoid, whereby actuation of one solenoid will cause said rocker arm to rotate in one direction, and actuation of said other solenoid will cause said arm to rotate in the opposite direction; and
    a pair of permanent magnets, one located near either end of said rocker arm whereby said magnets will engage and latch their respective ends of said arm whenever said arm is moved into contact therewith.

2. A valve assembly as set forth in claim 1 including:
    switch means mounted in said body and cooperable with said rocker arm for deactuating said solenoids whenever said rocker arm has been moved from one position to the other.

3. A valve assembly as set forth in claim 2 including:
indicator means actuated by said switch means for indicating when said valve means is in the open or the closed position.

4. A valve assembly comprising:
a body having a plurality of spaced and parallel chambers, each chamber having an inlet and an outlet and defining a separate flow path through the body;
a valve means mounted in each of said chambers adapted to seat with said outlet when in a closed position and movable away from said outlet when in an open position;
means in each chamber to normally bias said valve means to a closed position;
a rocker arm;
operating means connecting said rocker arm to each of said valve means whereby rotation of said rocker arm will move said valve means from one position to the other;
actuator means in said body located at either end of said rocker arm and adapted to alternately engage said ends of said rocker arm to impart rotational movement to said arm; and
latch means in said body cooperative with said rocker arm to latch said valve means in an open or closed position whenever said valve means is moved to that respective position.

5. A valve assembly as set forth in claim 4 wherein said operating means comprises:
an operating rod attached to the rocker arm and pivotally mounted in said body, said rod extending askew to each of said chambers; and
fork-like elements connected to said rod at selected intervals, each element being operably connected to a respective valve means.

6. A valve assembly as set forth in claim 4 wherein said actuator means comprises:
a pair of electrically actuated solenoid means, one located near each end of said rocker arm; and
means connecting each of said solenoid means to its respective end of said rocker arm whereby alternately actuating said solenoids, said rocker arm will be respectively rotated in opposite directions.

7. A valve assembly as set forth in claim 6 including:
switch means mounted in said body and cooperable with said rocker arm for deactuating said solenoid means whenever said valve means have been moved from one of its positions to the other of its positions.

8. A valve assembly as set forth in claim 7 including:
indicator means actuated by said switch means for indicating when said valve means are in an open or a closed position.

9. A valve assembly as set forth in claim 7 wherein said ends of said rocker arm are of magnetic material, and wherein said latch means comprise:
a pair of permanent magnets mounted in said body, one located near each end of said arm whereby said magnets will engage and latch their respective ends of said arm whenever said arm is moved into contact therewith.

References Cited
UNITED STATES PATENTS

| | | | |
|---|---|---|---|
| 2,505,710 | 4/1950 | Hayden | 137—625.68 |
| 2,528,898 | 11/1950 | McIlvaine | 137—554 |
| 2,708,948 | 5/1955 | Segerstad | 137—625.61 |
| 3,117,585 | 1/1964 | Gerwig et al. | 137—625.61 |
| 3,128,678 | 4/1964 | Jones | 251—137 XR |
| 3,176,516 | 4/1965 | Guenther | 251—138 XR |

HENRY T. KLINKSIEK, *Primary Examiner.*